United States Patent
Jeong

(10) Patent No.: US 7,092,048 B2
(45) Date of Patent: Aug. 15, 2006

(54) LIQUID CRYSTAL DISPLAY DEVICE

(75) Inventor: Seung-Chul Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/196,986

(22) Filed: Jul. 18, 2002

(65) Prior Publication Data

US 2003/0016313 A1    Jan. 23, 2003

(30) Foreign Application Priority Data

Jul. 20, 2001    (KR) ............................. 2001-43706

(51) Int. Cl.
*G02F 1/1333*    (2006.01)
(52) U.S. Cl. .................. 349/58; 362/633; 362/634
(58) Field of Classification Search ............... 349/58, 349/65, 62; 362/31, 26, 559, 561, 600, 632–634
See application file for complete search history.

(56) References Cited

U.S. PATENT DOCUMENTS

| | | | | |
|---|---|---|---|---|
| 2,907,869 A * | 10/1959 | Hudson et al. ............... | 362/27 |
| 2,994,971 A * | 8/1961 | Meisenheimer ............. | 434/289 |
| 3,561,145 A * | 2/1971 | Shotwell ..................... | 40/546 |
| 3,864,905 A * | 2/1975 | Richardson .................. | 368/67 |
| 4,975,808 A * | 12/1990 | Bond et al. .................... | 362/31 |
| 5,769,521 A * | 6/1998 | Osawa et al. ................. | 362/27 |
| 5,949,505 A * | 9/1999 | Funamoto et al. ............ | 349/65 |
| 5,966,191 A * | 10/1999 | Lee ............................... | 349/58 |
| 5,988,827 A * | 11/1999 | Lee ............................... | 362/31 |
| 6,108,060 A * | 8/2000 | Funamoto et al. ............ | 349/65 |
| 6,139,163 A * | 10/2000 | Satoh et al. .................. | 362/31 |
| 6,295,405 B1* | 9/2001 | Jannson et al. ............. | 385/146 |
| 6,512,557 B1* | 1/2003 | Miwa ........................... | 349/58 |
| 6,538,710 B1* | 3/2003 | Jang ............................. | 349/65 |
| 6,595,651 B1* | 7/2003 | Jeong et al. .................. | 362/31 |
| 6,854,858 B1* | 2/2005 | Jeong et al. .................. | 362/31 |
| 2002/0044438 A1* | 4/2002 | Ono et al. ..................... | 362/31 |
| 2002/0057562 A1* | 5/2002 | Sasako et al. ................ | 362/31 |
| 2002/0093603 A1 | 7/2002 | Chen ............................ | 349/65 |

FOREIGN PATENT DOCUMENTS

JP    04-225596    8/1992

* cited by examiner

*Primary Examiner*—Thien M. Le
*Assistant Examiner*—Kumiko C. Koyama

(57) ABSTRACT

The present invention relates to an LCD module and an LCD device that minimizes movement of a light guide plate. In an embodiment of the present invention, the light guide plate has catching jaws and projections. The catching jaws are formed by cutting at least one corner of an end portion of the light guide plate. The projections extend outwardly from sidewalls of the catching jaws, which have a thinner thickness than the catching jaws. A mold frame receives the light guide plate and the lamp unit and has catching bosses and recesses. The catching bosses are formed at positions corresponding to the catching jaws on a bottom surface of the mold frame to engage with the catching jaws to fix the light guide plate in the mold frame. The recesses are formed at respective positions corresponding to the projections at sidewalls of the mold frame to receive the projections.

12 Claims, 21 Drawing Sheets

LIQUID CRYSTAL DISPLAY DEVICE

BACKGROUND OF THE INVENTION

1. Field of the Invention

The present invention relates to a liquid crystal display (LCD) device, and more particularly to a LCD module and a LCD device that can minimize the movement of a light guide plate received in a mold frame by improving the structure of the light guide plate and the mold frame of the LCD device.

2. Description of the Related Art

Recently, an information processing device has been developed to have various shapes, various functions, and a rapid information processing speed. The information processed in the information processing device has an electrical signal. In order to confirm the information processed in the information processing device with the naked eye, a display device that functions as an interface device is needed.

Recently, a LCD device that is lighter, and smaller than a CRT type display device has been developed. The LCD device now displays a full color spectrum in a high resolution. As a result, the LCD device is widely used as a computer monitor, a television receiver, and other display devices.

The LCD device applies a voltage to a liquid crystal layer to change the molecular arrangement of the liquid crystal layer. The LCD device changes the optical properties in the liquid crystal and uses the modulation of a light by using a liquid crystal cell.

There are two kinds of LCD devices: a TN (Twisted Nematic) type, and an STN (Super-Twisted Nematic) type. Also, they can be grouped into an active matrix display type that uses a switching device and a TN liquid crystal, and a passive matrix display type that uses a STN liquid crystal according to the driving type.

The active matrix display method is used in a TFT-LCD and drives an LCD by using a thin film transistor (TFT) as a switch. The passive matrix display method does not use any transistor and does not require a complex circuit.

Further, LCD devices are grouped into a transmissive LCD device that uses a backlight and a reflective LCD device that uses an exterior light source, according to a method for using a light source.

The transmissive LCD device using the back light as a light source is relatively heavy and voluminous due to the back light, but it is widely used since it does not use an exterior light source and displays an image independently from the exterior light source.

FIG. 1 is an exploded perspective view schematically showing a conventional LCD device. FIG. 2 is a partial exploded perspective view of the LCD device shown in FIG. 1.

Referring to FIG. 1, the LCD device 900 has a LCD module 700 to which an image signal is applied to display an image, and a front case 810 and a rear case 820 for receiving the LCD module 700.

The LCD module 700 has a display unit 710, which includes a LCD panel for displaying the image.

The display unit 710 has a LCD panel 712, an integrated and printed circuit board 714, a data side tape carrier package 716, and a gate side flexible circuit board 718 manufactured by the COF (chip-on-film) method.

The LCD panel 712 has a TFT substrate 712a, a color filter substrate 712b, and a liquid crystal layer (not shown) interposed therebetween.

The TFT substrate 712a is a transparent glass substrate on which TFTs are formed in a matrix shape. Data lines are connected to source terminals of the TFTs, and gate lines are connected to gate terminals of the TFTs. Pixel electrodes of indium tin oxide (ITO), which is a transparent conductive material, are formed on drain terminals.

If electrical signals are inputted to the data lines and to the gate lines, the electrical signals are inputted to the source terminals and to the gate terminals of TFTs and the TFTs are turned on or off so that electrical signals for forming pixels are outputted to the drain terminals.

The color filter substrate 712b is attached to the TFT substrate 712a. RGB pixels that pass light through to realize color display are formed on the color filter substrate 712b by a thin film process. A common electrode comprised of ITO is coated on the front surface of the color filter board 712b.

If electric power is applied to the gate terminals and to the source terminals of the transistors and the TFTs are turned on, an electric field is formed between the pixel electrode on the TFT substrate and the common electrode of the color filter substrate. The arrangement angles of the liquid crystals injected between the TFT substrate 712a and the color filter substrate 714b are changed by the electric field, and the light passages are changed due to the arrangement angle changes to obtain a desired pixel status.

A driving signal and a timing signal are applied to the gate line and to the data line of the TFT to control the arrangement of the liquid crystal of the LCD panel 712 and the timing when the liquid crystal is arranged. The data side tape carrier package 716, which is a kind of flexible circuit board for determining the timing when the data driving signal is applied, is attached to the source side of the LCD panel 712, and the gate side flexible circuit board 718 manufactured by the COF method for determining the time when the gate driving signal is applied is attached to the gate side of the LCD panel 712.

The integrated and printed circuit board 714 for receiving image signals from outside of the LCD panel 712, and for applying driving signal to the gate line and to the data line, is connected to the data tape carrier package 716 of the data line side of the LCD panel 712. The integrated printed circuit board 714 has a source portion to which the image signals generated from an exterior information processing device (not shown), such as a computer, are applied to provide the data driving signals to the LCD panel 712 and a gate portion for providing the gate driving signals to the gate line of the LCD panel 712. Namely, the integrated printed circuit board 714 generates the gate driving signals for driving the LCD device, the data signals, and a plurality of timing signals for applying the signals. The gate signals are applied to the gate line of the LCD panel 712 through the gate side flexible circuit board 718, and the data signals are applied to the data line of the LCD panel 712 through the data tape carrier package 716.

A back light assembly 720 for providing a uniform light to the display unit 710 is provided under the display unit 710. The back light assembly 720 has a lamp 721, which is provided on one side of the LCD module 700 to generate the light. The lamp 721 is protected by a lamp cover 722. A light guide plate 724 has a size corresponding to the LCD panel 712 of the display unit 710, and is located under the LCD panel 712. The lamp side of the light guide plate 724 is thicker than the other side opposite to the lamp side, and it guides the light generated by the lamp 721 towards the display unit 710 to change the passage of the light.

A plurality of optical sheets 726, for making the luminance of the light irradiated from the light guide plate 724 and passed towards the LCD panel 712 uniform, are provided above the light guide plate 724. A reflection plate 728, for reflecting the light leaked from the light guide plate 724 to increase the efficiency, is provided under the light guide plate 724.

The display unit 710 and the back light assembly 720 are fixed and supported by a mold frame 730 that is a receiving receptacle. The mold frame 730 has a box-shape, and the upper surface of the mold frame 730 is open. That is, the mold frame 730 has four side walls and a bottom surface, and openings, for bending the integrated printed circuit board 714 along the outer side surface of the mold frame 730 and positioning the integrated printed circuit board 714, are formed on the lower surface of the bottom.

A chassis 740 for bending the integrated printed circuit board 714 of the display unit 710 and the gate tape carrier package 718 outside of the mold frame 730, and for fixing the integrated printed circuit board 714 of the display unit 710 and the gate tape carrier package 718 to the bottom surface of the mold frame 730 to prevent the deviation of the display unit 710, is provided. The chassis 740 has a box-shape in the same manner as a mold frame 730. The upper surface of the chassis 740 is opened to expose the LCD panel 710, and the side walls are bent inwardly to cover the upper surface peripheral portion of the LCD panel 710.

On the other hand, referring to FIG. 2, first and second catching bosses 731 and 732 are integrally formed with the mold frame 730 on the corner portions of the mold frame on which the lamp 721 (see FIG. 1) is installed in the receiving space of the mold frame 730. The corner of an end portion, which is located on the side of the lamp 721 in the light guide plate 724 received in the mold frame 730, is cut off to form first and second catching jaws 724a and 724b.

FIG. 3 shows the state in which the light guide plate shown in FIG. 2 is received in the mold frame. FIG. 4 is a partially enlarged view of section "P1" showing the fixing structure of the light guide plate shown in FIG. 3 and the mold frame. FIG. 5 is a top view showing the size of the light guide plate shown in FIG. 3.

Referring first to FIG. 3, if the light guide plate 724 is received in the mold frame 730, the first and second catching jaws 724a and 724b are engaged with the first and second catching bosses 731 and 732. Therefore, even when exterior impacts are applied to the LCD device 900, the light guide plate 724 does not move towards the lamp 721 due to the presence of first and second catching bosses 731 and 732.

However, it is now desirable for the thickness of the side wall of the mold frame 730 to become thinner so as to minimize the size of the LCD device 900. Further, as shown in FIG. 5, the width of the light guide plate 724 of the end portion of the side of the lamp 721 is identical to the width of the end portion of the opposite end portion. That is, width $W_1$ equals width $W_2$. Therefore, it is not easy to sufficiently guarantee the thickness of the first and second catching bosses 731 and 732 that are integrally formed with the mold frame 730. Therefore, as shown in FIG. 4, the catching force of the first and second catching jaws 724a and 724b of the light guide plate 724 and the first and second catching bosses 731 and 732 of the mold frame 730 can not be sufficiently guaranteed so that preventing the light guide plate 724 from moving towards the lamp 721 is difficult.

On the other hand, if the width of the light guide plate 724 increases by the gap between the light guide plate 724 and the mold frame 730 to guarantee the catching force (i.e., by width $W_3$), the catching force of the first and second catching jaws 724a and 724b and the first and second catching bosses 731 and 732 can be obtained. However, without the gap between the light guide plate 724 and the mold frame 730, the thermal expansion space of the light guide plate 724 according to the temperature change and the humidity change cannot be guaranteed, thereby greatly inducing the folding phenomenon. Especially, in the wedge type light guide plate 724 shown in FIGS. 1 and 2, since the thermal expansion rate is large at the portion where the light guide plate 724 is thin, the sufficient gap between the light guide plate 724 and the mold frame 730 is necessary.

On the other hand, even though it is not shown in the figure, the movement of the light guide plate 724 can be prevented by protruding a portion of both side surfaces of the light guide plate 724, forming a boss, and forming a recess at a position that corresponds to the boss on both side walls of the mold frame 730. However, in that case, it is not easy to guarantee the catching force between the boss and the recess and to prevent the light inputted from the lamp 721 from being concentrated at a corner portion defined by the boss and the recess.

SUMMARY OF THE INVENTION

The present invention has been made to solve the above-mentioned problems, and accordingly it is an object of the present invention to provide a LCD module that can minimize the moving of a light guide device received in the mold frame.

It is another object of the present invention to provide a LCD device that can prevent a light guide device received in the mold frame from being damaged.

To achieve the object of the present invention, a LCD module according to the present invention includes a light guide plate for guiding light emitted from a lamp unit to a display unit to display images. The light guide plate has a catching jaw formed by cutting at least one corner of a first end portion receiving the light from the lamp unit and a projection extending outwardly from sidewalls of the catching jaws and having a thinner thickness than that of the catching jaws. A mold frame receives the light guide plate and the lamp unit. The mold frame has a catching boss and recess. The catching boss is formed at a first position corresponding to the catching jaw on a bottom surface of the mold frame to engage with the catching jaws so as to fix the light guide plate in the mold frame. The recess is formed at a second position corresponding to the projection in a sidewall of the mold frame to receive the projection.

To achieve the other object of the present invention, a LCD device according to the present invention includes a backlight assembly including a light guide plate for guiding light emitted from a lamp unit to a display unit to display images. The light guide plate has a catching jaw and a projection. The catching jaw is formed by cutting at least one corner of a first end portion receiving the light from the lamp unit. The projection extends outwardly from a sidewall of the catching jaws and has a thinner thickness than that of the catching jaw. A mold frame receives the light guide plate and the lamp unit. The mold frame has a catching boss and recess, the catching boss being formed at a first position corresponding to the catching jaw on a bottom surface of the mold frame to engage with the catching jaw so as to fix the light guide plate in the mold frame. The recess is formed at a second position corresponding to the projection in a sidewall of the mold frame to receive the projection. A top chassis is oppositely combined to the mold frame, for guiding the display unit while fixing the display unit and the backlight assembly to the mold frame.

The projections have a width that gradually decreases from one end to another end of the light guide plate. The light guide plate is a wedge type of light guide plate of which a thickness is gradually thinner from one end to another end thereof. The respective recess formed in a respective sidewall of the mold frame has a width that is larger than the thickness of the respective projection but is smaller than the thickness of the respective catching jaw. A thickness of an area in which the catching jaws are engaged with the catching bosses is the same as the projections.

In the LCD module and the LCD device, even if exterior impacts are applied to the liquid crystal device, since the catching bosses of the mold frame are respectively and rigidly engaged with the catching jaws, the light guide plate is prevented from moving towards the lamp.

In addition, even though the exterior impacts are applied to the side walls of the mold frame, the projections and the catching jaws can be prevented from being damaged because the projections are respectively received in the recesses of the mold frame. Further, since the projections are formed so as to have a slope shape, the concentration of the light inputted from the lamp is prevented.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, a LCD module and a LCD device according to the preferred embodiments of the present invention will be described in detail with reference to FIGS. 6 to 21, which are attached hereto.

Embodiment 1

Figure 1:
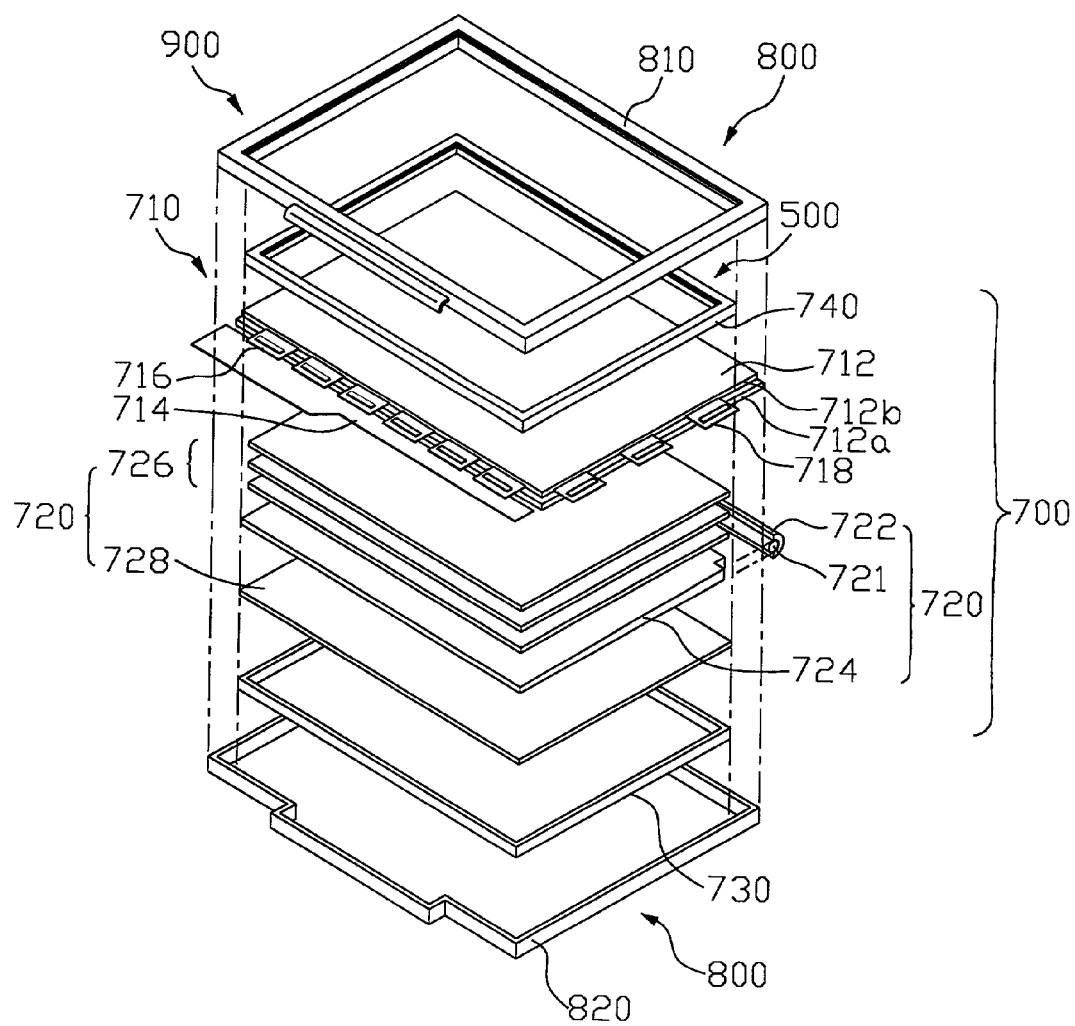
FIG. 1 is an exploded perspective view for schematically showing a conventional LCD device.
Figure 2:
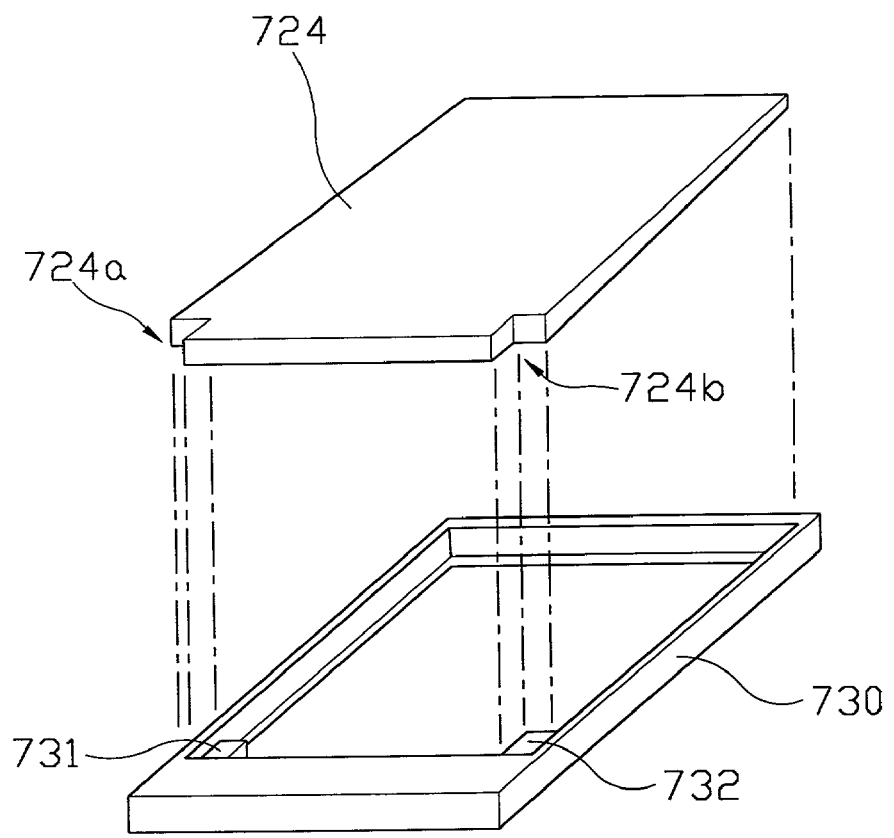
FIG. 2 is an exploded perspective view for showing the structure of a light guide plate and a mold frame shown in FIG. 1.
Figure 3:
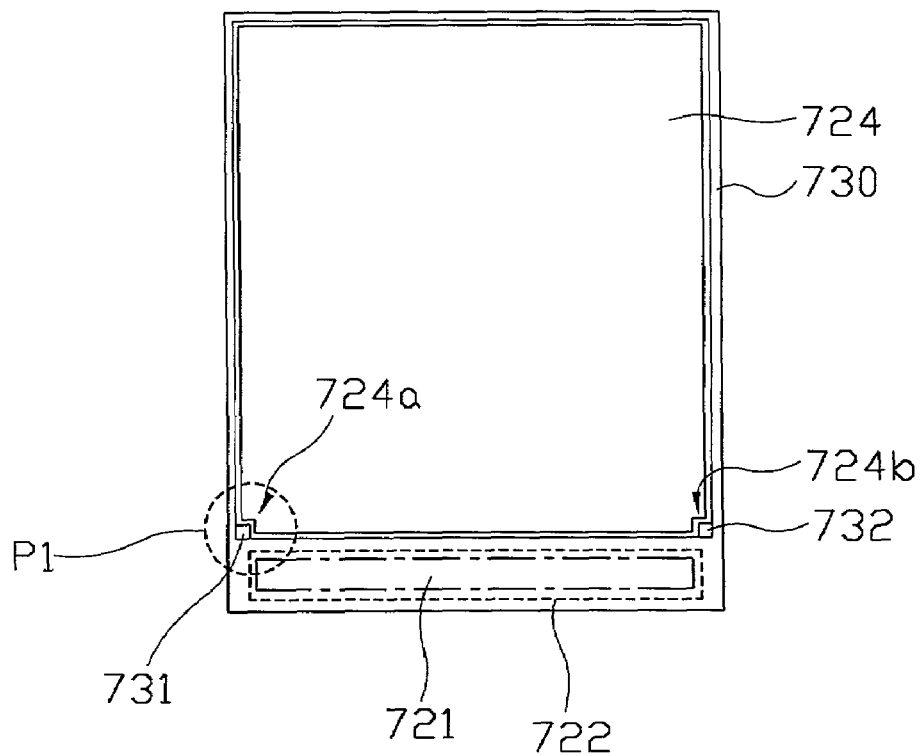
FIG. 3 is a view for showing the state in which the light guide plate shown in FIG. 2 is received in the mold frame.
Figure 4:
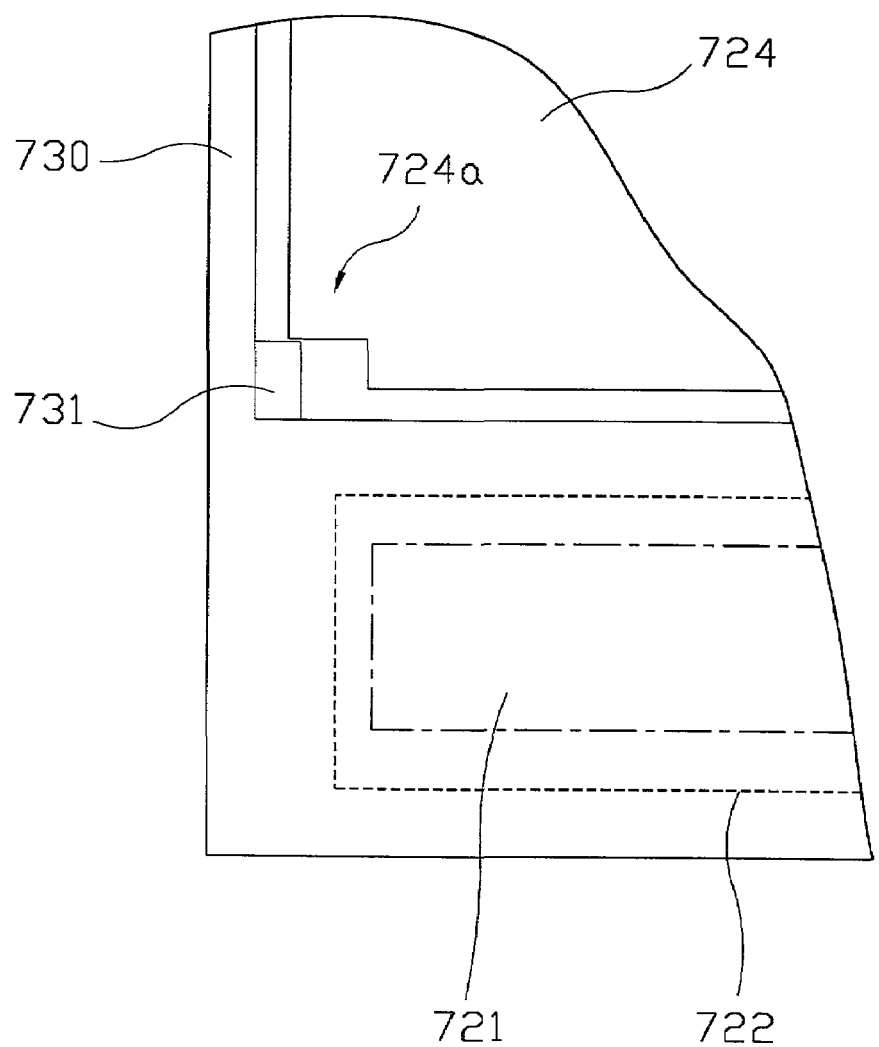
FIG. 4 is a partially enlarged view for showing the horizontal fixing structure of the light guide plate and the mold frame shown in FIG. 3.
Figure 5:
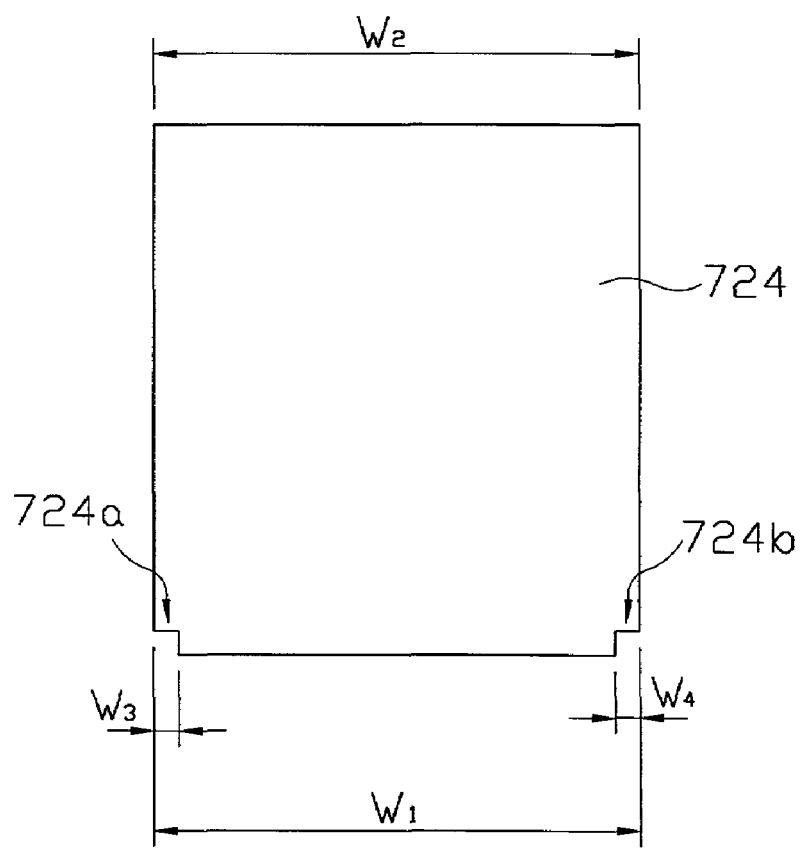
FIG. 5 is a top view, for showing the size of the light guide plate shown in FIG. 3.
Figure 6:
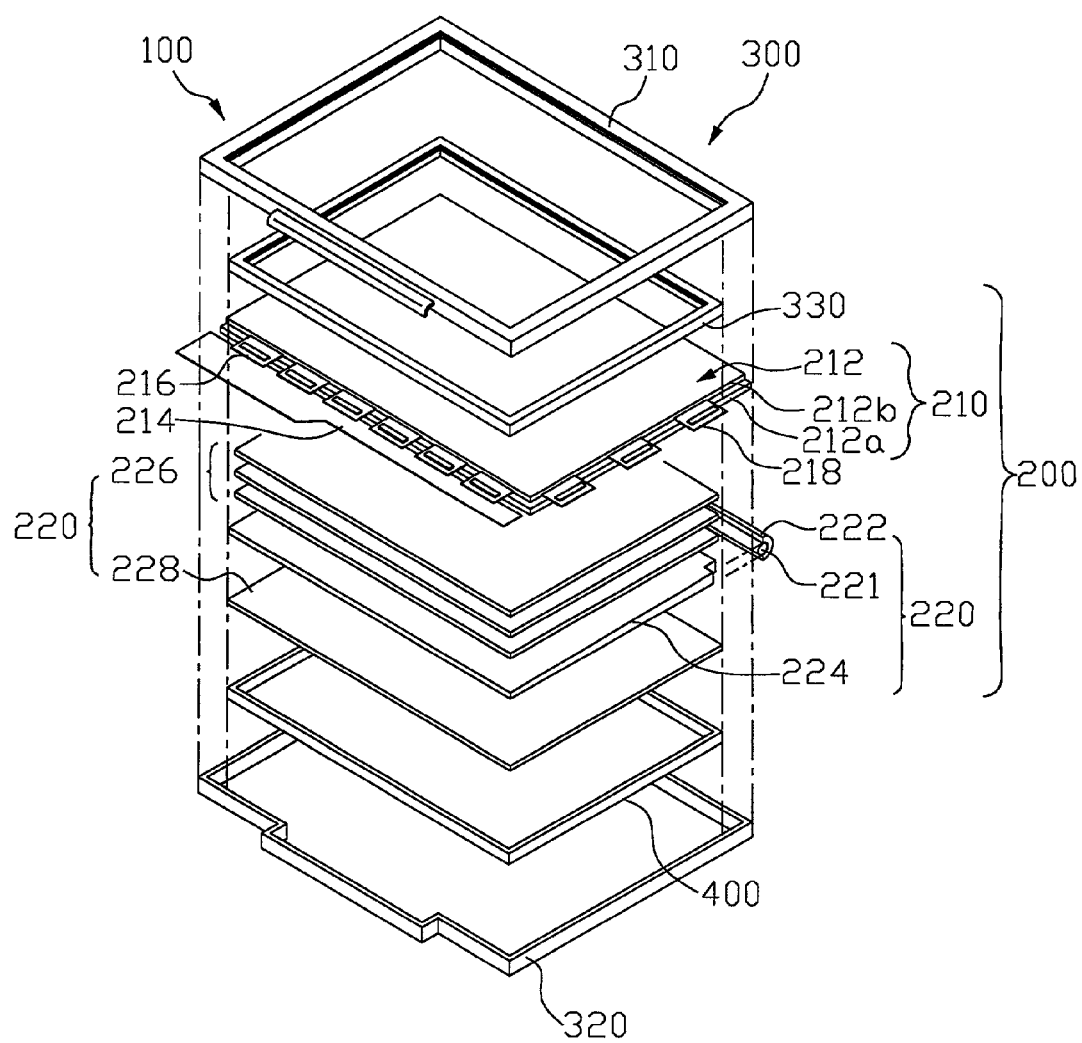
FIG. 6 is an exploded perspective view for showing a LCD device according to a first preferred embodiment of the present invention.

FIG. 6 is an exploded perspective view for schematically showing a LCD device according to a first embodiment of the present invention.

Referring to FIG. 6, the LCD device 100 has a LCD module 200 to which an image signal is applied to display images and a case 300, which includes a front case 310 and a rear case 320 for receiving the LCD module 200. The LCD module 200 has a display unit 210 including a LCD panel that displays the images. A chassis 330 bends the integrated printed circuit board 214 of the display unit 210.

The display unit 210 has a LCD panel 210, an integrated printed circuit board 214, a data side tape carrier package 216 and a gate side flexible circuit board 218 manufactured by the COF method.

The LCD panel 212 has a TFT substrate 212*a*, a color filter substrate 212*b* and a liquid crystal (not shown) interposed therebetween.

The TFT substrate 212*a* is a transparent glass substrate on which TFTs are formed in a matrix shape. Data lines are connected to source terminals of the TFTs, and gate lines are connected to gate terminals of the TFTs. Pixel electrodes of indium tin oxide (ITO), which is a transparent conductive material, are formed on drain terminals.

If electrical signals are inputted to the data lines and to the gate lines, the electrical signals are inputted to the source terminals and to the gate terminals of the TFTs and the TFTs are turned on or off as the electrical signals for forming pixels are outputted to the drain terminals.

The color filter substrate 212*b* is attached to the TFT substrate 212*a*. RGB pixels that pass light through to realize color display is formed on the color filter substrate 212*b*. A common electrode comprised of ITO is coated on the front surface of the color filter board 212*b*.

If power sources are applied to the gate terminals and to the source terminals of the transistors and the TFTs are turned on, an electric field is formed between the pixel electrode on the TFT substrate 212*a* and the common electrode on the color filter substrate 212*b*. The arrangement angles of the liquid crystals between the TFT substrate 212*a* and the color filter substrate 212*b* are changed by the electric field, and the light passage are changed due to the arrangement angle changes to obtain a desired pixel status.

A driving signal and a timing signal are applied to the gate line and to the data line of the TFT to control the arrangement of the liquid crystal of the LCD panel 212 and the timing when the liquid crystal is arranged.

The data side tape carrier package 216, which is a kind of flexible circuit board determining the timing when the data driving signal is applied, is attached to the source side of the LCD panel 212, and the gate side flexible circuit board 218 manufactured by the COF method for determining the time when the gate driving signal is applied is attached to the gate side of the LCD panel 212.

The integrated printed circuit board 214 for receiving image signals from outside of the liquid crystal display panel 212 and for applying driving signal to the gate line and the data line is connected to the tape carrier package 216 of the data line side of the liquid crystal display panel 212. The integrated printed circuit board 214 has a source portion to which the image signals generated in an exterior information processing device (not shown) such as a computer are applied to provided the data driving signals to the liquid crystal display panel 212 and a gate portion for providing the gate driving signals to the gate line of the liquid crystal display panel 212.

Namely, the integrated printed circuit board 214 generates the gate driving signals for driving the LCD device, the data signals, and a plurality of timing signals for applying the signals. The gate driving signals are applied to the gate line of the LCD panel 212 through the gate side flexible circuit board 218, and the data signals are applied to the data line of the LCD panel 212 through the data tape carrier package 216.

A back light assembly 220 for providing a uniform light to the display unit 210 is provided under the display unit 210. The back light assembly 220 has a lamp 221, which is provided on one side of the LCD module 200 to generate the light. The lamp 221 is protected by a lamp cover 222. A light guide plate 224 has a size corresponding to the LCD panel 212 of the display unit 210, and is located under the LCD panel 212. The lamp side of the light guide plate 224 is thicker than the other side opposite to the lamp side, and it guides the light generated in the lamp 221 towards the display unit 210 to change the path of the light.

A plurality of optical sheets 226, for making the luminance of the light irradiated from the light guide plate 224 and passed towards the LCD panel 212 uniform, are provided above the light guide plate 224. A reflection plate 228, for reflecting the light leaked from the light guide plate 224 to increase the light efficiency, is provided under the light guide plate 224. The display unit 210 and the back light assembly 220 are fixed and supported by a mold frame 400.

Figure 7:
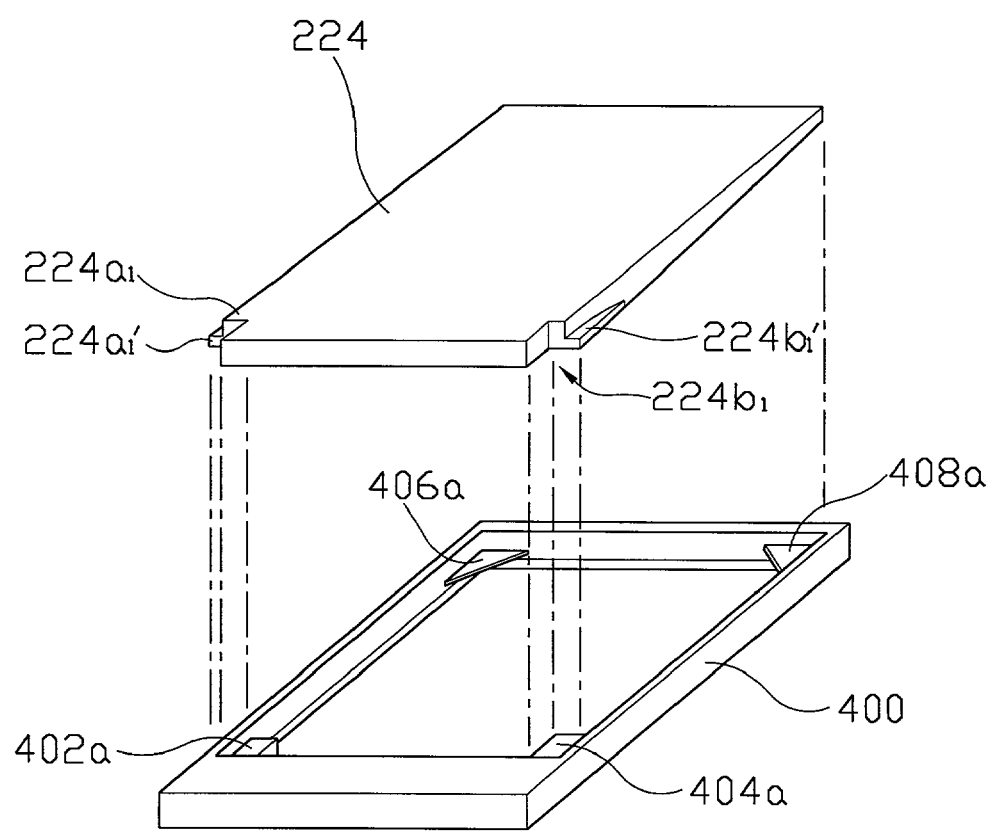
FIG. 7 is an exploded perspective view for showing the structure of a light guide plate and a mold frame of the LCD device according to the first preferred embodiment of the present invention that are shown in FIG. 6.
Figure 8:
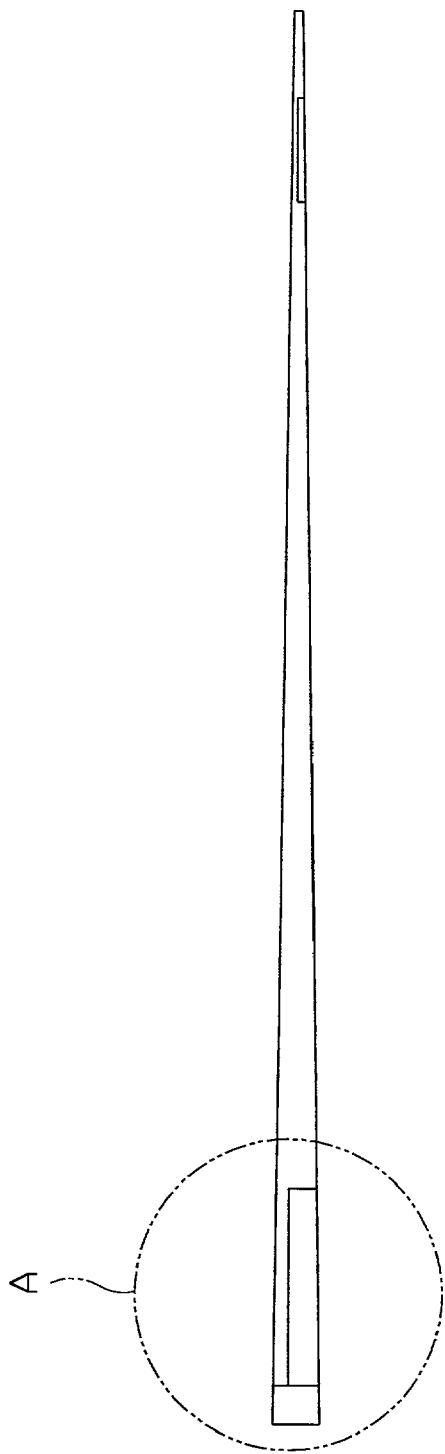
FIGS. 8 and 9 are partially cut perspective views for showing the structure of the light guide plate shown in FIG. 7.
Figure 9:
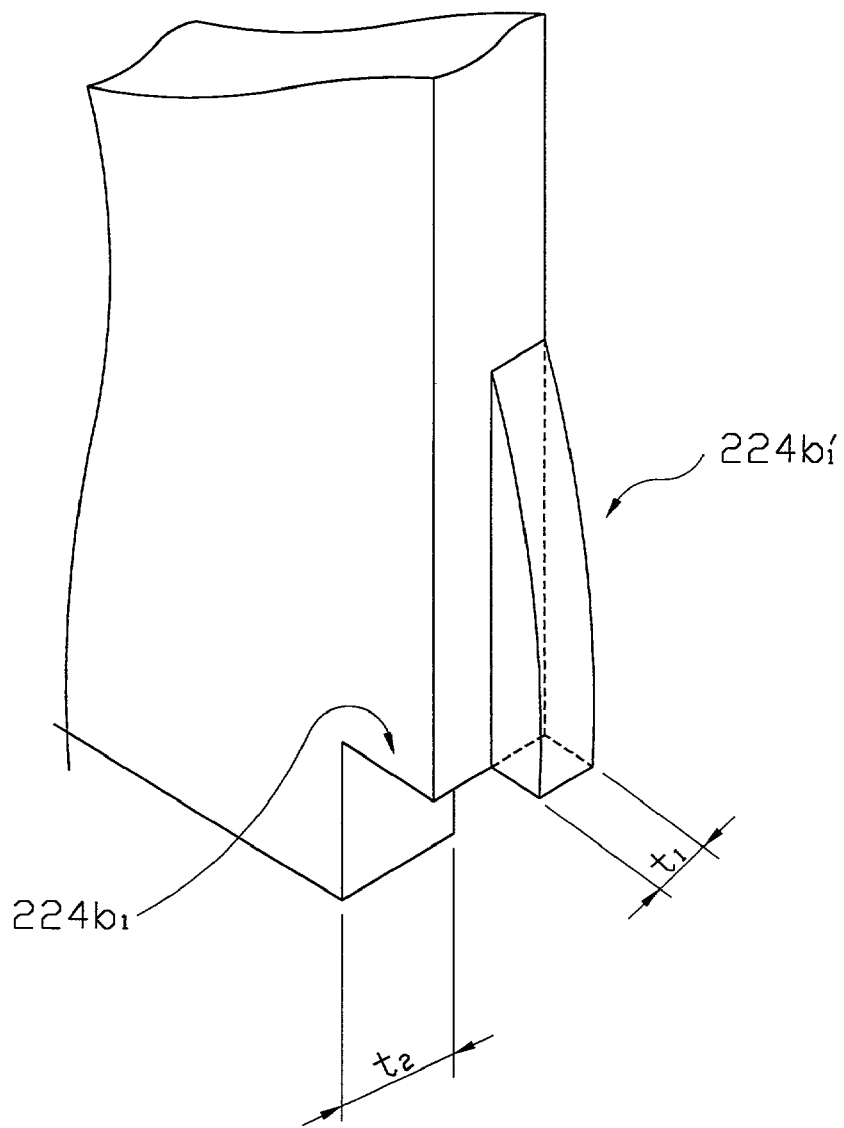
Figure 10:
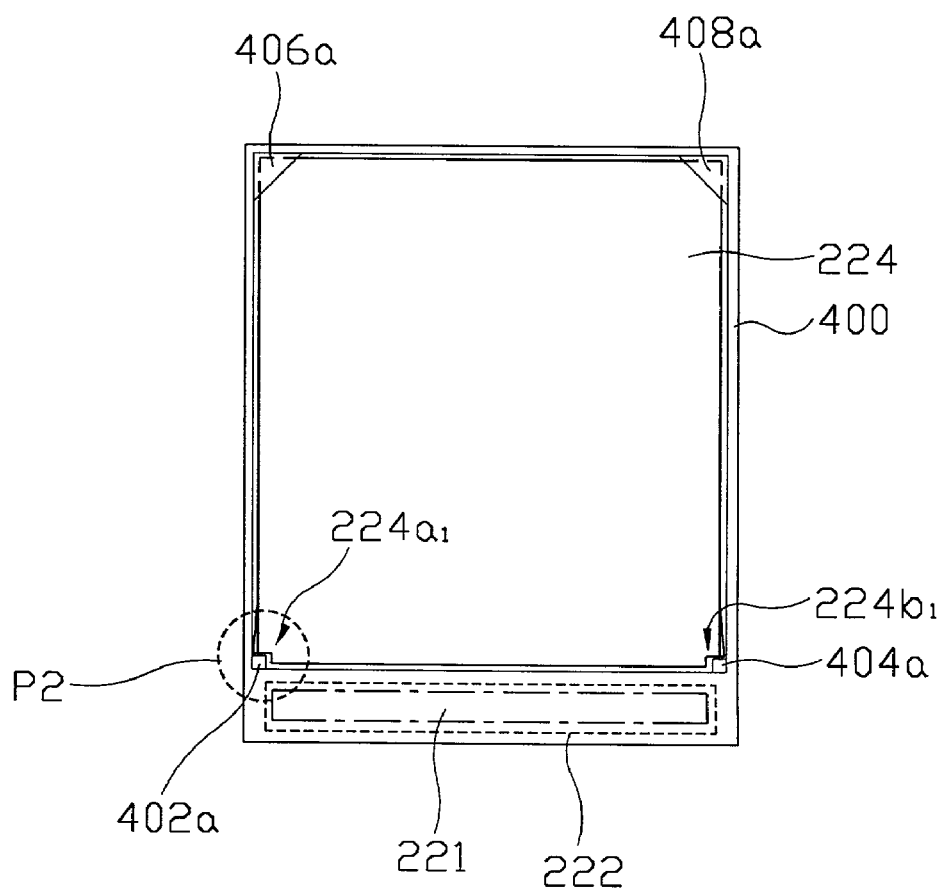
FIG. 10 is a view for showing the light guide plate according to the first embodiment of the present invention shown in FIG. 7, in which the light guide plate is received in the mold frame.

FIG. 7 is an exploded perspective view for showing the light guide plate 224 and the mold frame 400 of the LCD device 100 according to the first preferred embodiment of the present invention shown in FIG. 6. FIG. 8 is a side view for showing the structure of the sidewall of the light guide plate shown in FIG. 7. FIG. 9 is a partially cut perspective view for showing the structure of the light guide plate shown in FIG. 8. FIG. 10 is a plan view for showing the light guide plate according to the first preferred embodiment of the present invention shown in FIG. 7.

Referring first to FIG. 7, the light guide plate 224 is a wedge type light guide plate in which the thickness thereof becomes thinner further away from a first end portion on which the light is inputted from the lamp 221 (see FIG. 6). However, the first preferred embodiment according to the present invention is applied in a case where the thickness of the first end portion of the light guide plate 224 is the same as a second end portion opposite to the first end portion.

The first end portion of the light guide plate 224, i.e., both edge portions of the first end portion that is received in a receiving space of the mold frame 400 towards a position at which the lamp 221 is installed, is cut off to form a third catching jaw $224a_1$ and a fourth catching jaw $224b_1$. A first projection $224a_1'$ and a second projection $224b_1'$ extend outwardly from sidewalls of the third and fourth catching jaws $224a_1$ and $224b_1$, which respectively have a thinner thickness than the third and fourth catching jaws $224a_1$ and is $224b_1$.

Referring to FIGS. 8 and 9, the thickness $t_1$ of the second projection $224b_1'$ is thinner than the thickness $t_2$ of the fourth catching jaw $224b_1$. Meanwhile, the first projection $224a_1'$ has the same thickness as the second projection $224b_1'$, and the third catching jaw $224a_1$ has the same thickness as the fourth catching jaw $224b_1$. If the first and second projections $224a_1'$ and $224b_1'$ bear up the weight of the light guide plate 224, the thickness $t_1$ of the first and second projections $224a_1'$ and $224b_1'$ may be thinner than the thickness $t_2$ of the third and fourth catching jaws $224a_1$ and $224b_1$. This will be described below.

On the other hand, referring to FIG. 7, the lamp 221 and the lamp cover 222 are received on one side of the receiving space of the mold frame 400 that receives the light guide plate 224. Third and fourth catching bosses 402a and 404a, which are engaged with the third and fourth catching jaws $224a_1$ and $224b_1$ to prevent the movement of the horizontal direction of the light guide plate 224, are integrally formed with the mold frame 400 in both corner portions of the side wall on which the lamp 221 (see FIG. 6) is positioned.

Third and fourth catching covers 406a and 408a, for preventing the light guide plate 224 received in the mold frame 400 from being deviated to the vertical direction of the receiving space, are integrally formed with the mold frame 400 in both corner portions of the side wall opposite to the third and fourth catching bosses 402a and 404a.

As shown in FIG. 10, when the light guide plate 224 is received in the receiving space of the mold frame 400, the third catching jaw $224a_1$ is engaged with the third catching boss 402a and the fourth catching jaw $224b_1$ is engaged with the fourth catching boss 404a. A portion of the both corner portions of the second end portion of the light guide plate 224 is inserted into the lower side of the third and fourth catching covers 406a and 408a.

Figure 11:
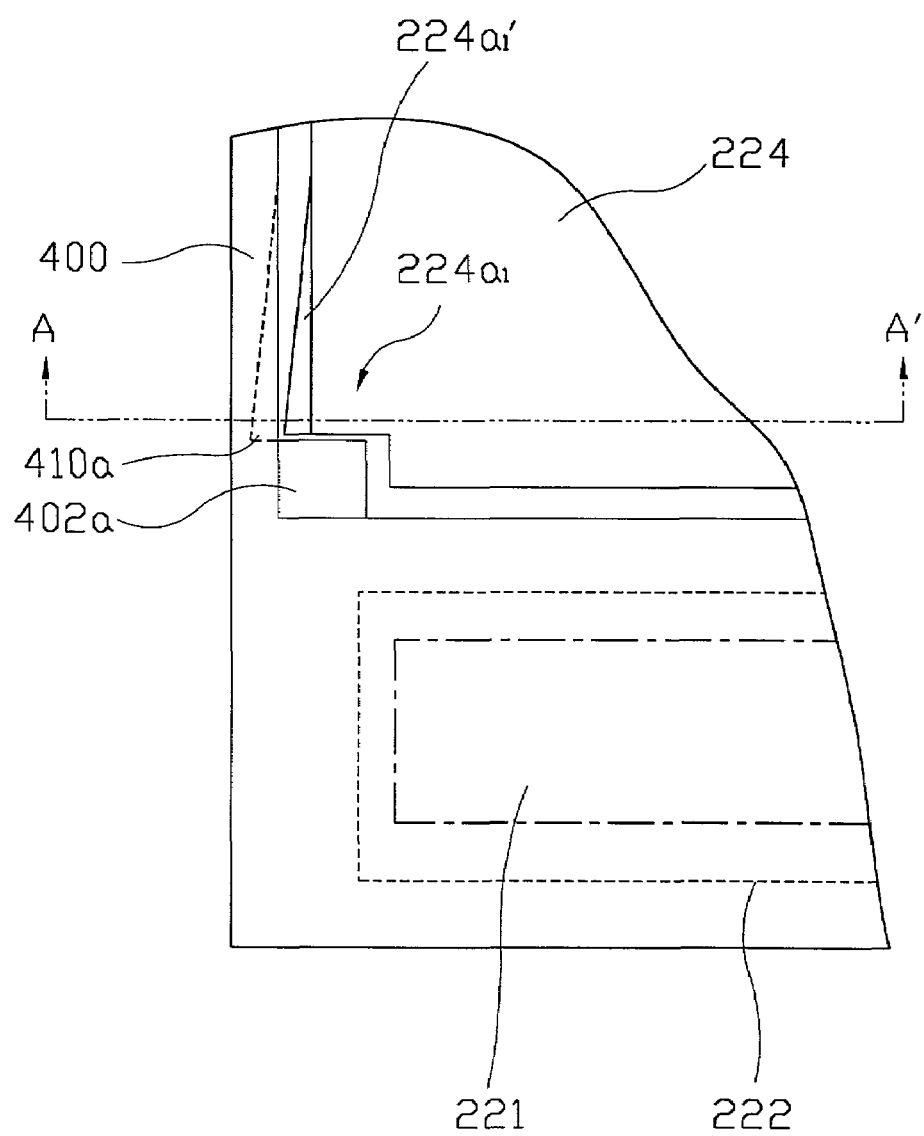
FIG. 11 is a partially enlarged view for showing the horizontal fixing structure of the mold frame and the light guide plate shown in FIG. 10.

FIG. 11 is a partially enlarged view of section "P1" for showing the fixing structure of the light guide plate 224 and the mold frame 400 according to the first embodiment of the present invention shown in FIG. 10.

Referring to FIG. 11, the gap between the side surface of the third catching jaw $224a_1$ and the sidewall of the mold frame 400 is narrower than the gap between the side surface of the second end portion of the light guide plate 224 and the mold frame 400. This is because the first projection $224a_1'$ is integrally formed with the light guide plate 224 on the side wall of the third catching jaw $224a_1$. The first projection $224a_1'$ has a slope shape in which the width thereof is narrower as it proceeds towards the second end portion.

Namely, the width of the third catching jaw $224a_1$ of the light guide plate 224 is narrower as it proceeds towards the first end portion to the second end portion. The width of the catching jaw $224b_1$ (not shown in FIG. 11) also is narrower similar to the third catching jaw $224a_1$. Therefore, the catching amount between the third and fourth catching jaws $224a_1$ and $224b_1$ and the third and fourth catching bosses 402a and 404a is increased by the width of the catching body.

Figure 12:
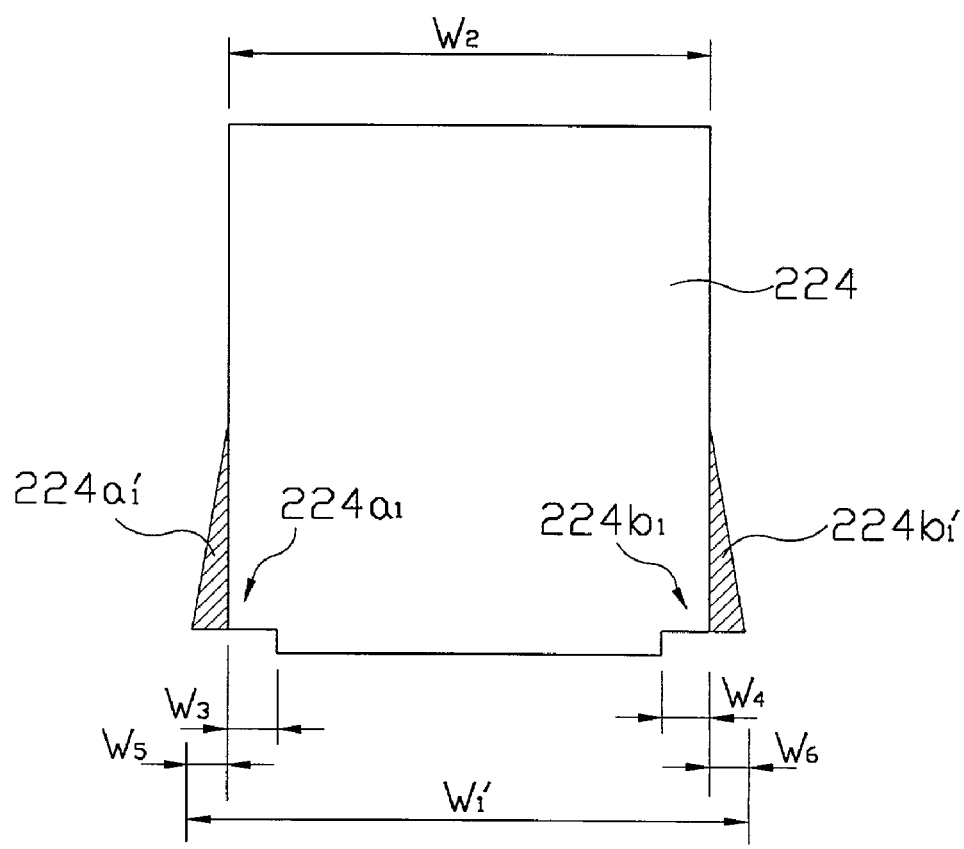
FIG. 12 is a top view for particularly showing the structure of the light guide plate shown in FIG. 10.

To describe this in more detail, as shown in FIG. 12, the widths $W_3$ and $W_4$ of the third and fourth catching jaws $224a_1$ and $224b_1$ of the light guide plate 224 are identical to each other before the first and second projections $224a_1'$ and $224b_1'$ are attached to the third and fourth catching jaws $224a_1$ and $224b_1$. In this case, the widths of the first end portion and the second end portion of the light guide plate 224 are the same. However, if the first and second projections $224a_1'$ and $224b_1'$ are respectively attached to the respective sidewall of the third and fourth catching jaws $224a_1$ and $224b_1$, the width $W_1'$ of the first end portion of the light guide plate 224 increases to the extent of the widths $W_5$ and $W_6$ of the first and second projections $224a_1'$ and $224b_1'$ in relation to the width $W_2$ of the second end portion of the light guide plate 224.

Therefore, as shown in FIG. 11, the catching force between the third and fourth catching jaws $224a_1$ and $224b_1$ and the third and fourth catching bosses 402a and 404a is sufficiently obtained so as to prevent the light guide plate 224 from being shifted toward the lamp 221 due to the exterior impacts. Further, since the first and second projections $224a_1'$ and $224b_1'$ have a slope shape in which the width thereof is narrower as it proceeds towards the second end portion, the concentration of the light irradiated from the lamp 221 is prevented. Since the gap between the light guide plate 224 and the side wall of the mold frame 400, except for the portion in which the first and second projections $224a_1'$ and $224b_1'$ are attached is sufficiently maintained, the folding of the light guide plate 224 due to the temperature and the humidity is prevented.

On the other hand, as shown in FIG. 11, both sidewalls of the mold frame 400, i.e., the sidewalls corresponding to the first and second projections $224a_1'$ and $224b_1'$, respectively, have first and second recesses 410a and 412a in which the first and second projections $224a_1'$ and $224b_1'$ are respectively received.

Figure 13:
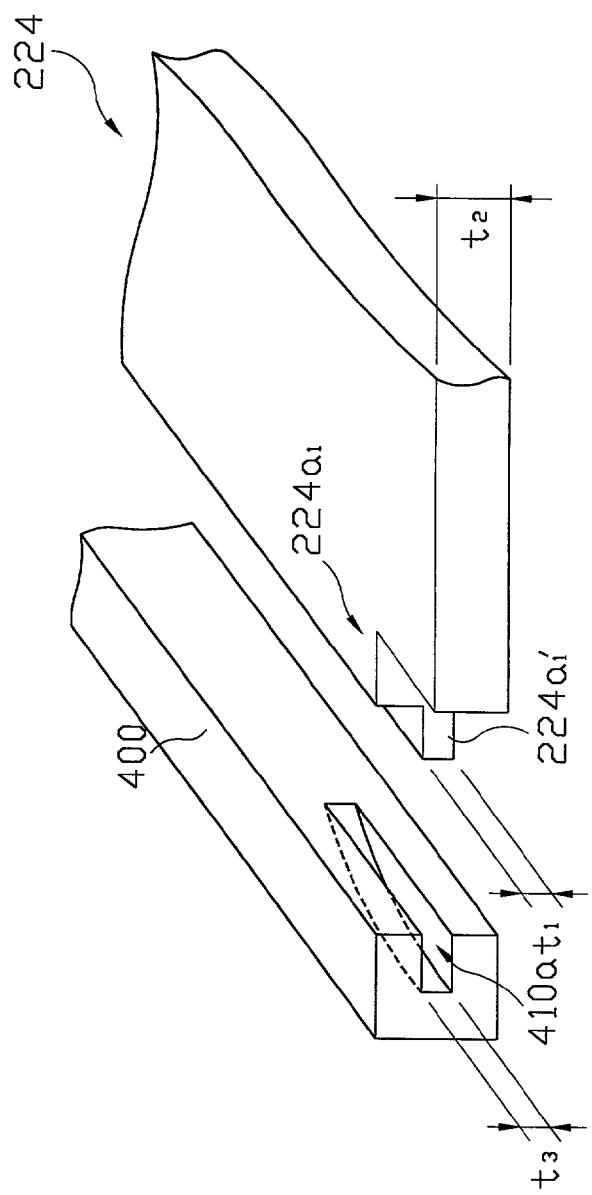
FIGS. 13 and 14 are views for showing the state in which a catching body of the light guide plate is combined within a recess of the mold frame shown in FIG. 11.
Figure 14:
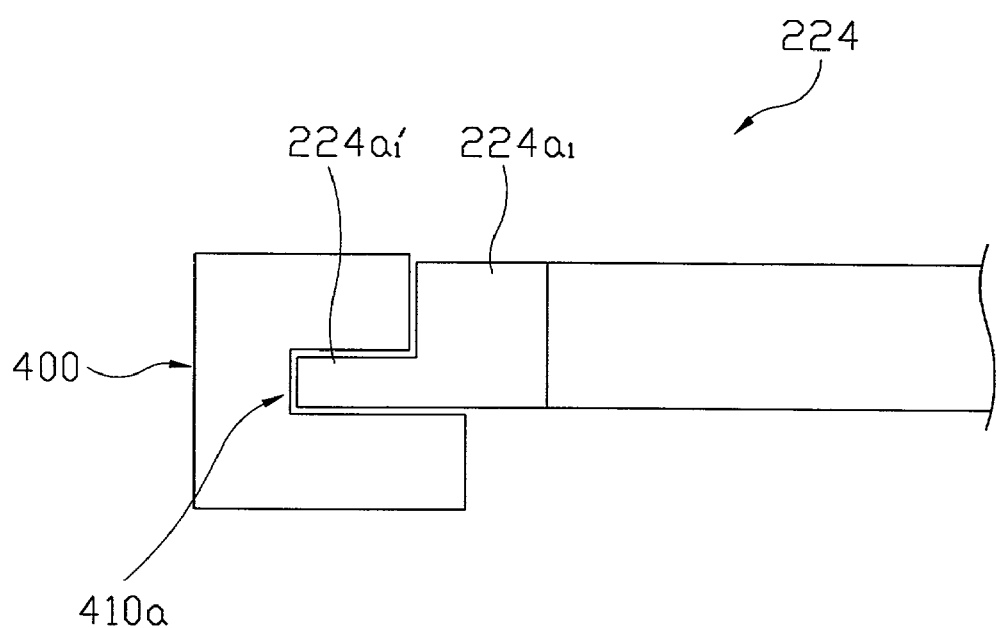

FIGS. 13 and 14 are views for showing the state in which the first projection $224a_1'$ is received in the first recess 410a shown in FIG. 11.

Referring to FIG. 13, the width $t_3$ of the first recess 410a is larger than the thickness $t_1$ of the first projection $224a_1'$, but it is smaller than the thickness $t_2$ of the catching jaw $224a_1$. Namely, the first recess 410a has a depth enough to receive the first projection $224a_1'$ and the depth at which the first projection $224a_1'$ is received in the first recess 410a is adjusted by the third catching jaw $224a_1$ as shown in FIG. 14. As not shown in the drawings, the second recess receiving the second projection $224b_1'$ has the same shape as the first recess 410a.

As shown in FIG. 10, the catching force between the third and fourth catching jaws $224a_1$ and $224b_1$ and the third and fourth catching bosses 402a and 404a are sufficiently obtained so as to prevent the light guide plate 224 from moving toward the lamp 221 in the mold frame 400 due to the exterior impact.

If the exterior impact is applied not to the lamp 221 of the mold frame 400, but is applied to both sidewalls of the mold frame 400 in which the first and second projections $224a_1'$ and $224b_1'$ are received, the first and second projections $224a_1'$ and $224b_1'$ of the light guide plate 224 firstly make contact with the respective sidewalls of the mold frame 400.

At that time, as the first and second recesses 410a and 412a receive the first and second projections $224a_1'$ and $224b_1'$ until making contact with the third and fourth catching jaws $224a_1$ and $224b_1$, the first and second projections $224a_1'$ and $224b_1'$ are prevented from colliding with the mold frame 400 to thereby prevent a damage from occurring.

Particularly, when the openings of the first and second recesses 410a and 412a face to the third and fourth catching jaws $224a_1$ and $224b_1$, and the sidewalls of the light guide plate 224 make contact with the sidewalls of the mold frame 400, the movements of the first and second projections $224a_1'$ and $224b_1'$ are stopped. In other word, the sidewalls of the light guide plate 224 make complete contact with the sidewalls of the mold frame 400, so that the movement of the light guide plate 224 is stopped.

Figure 15:
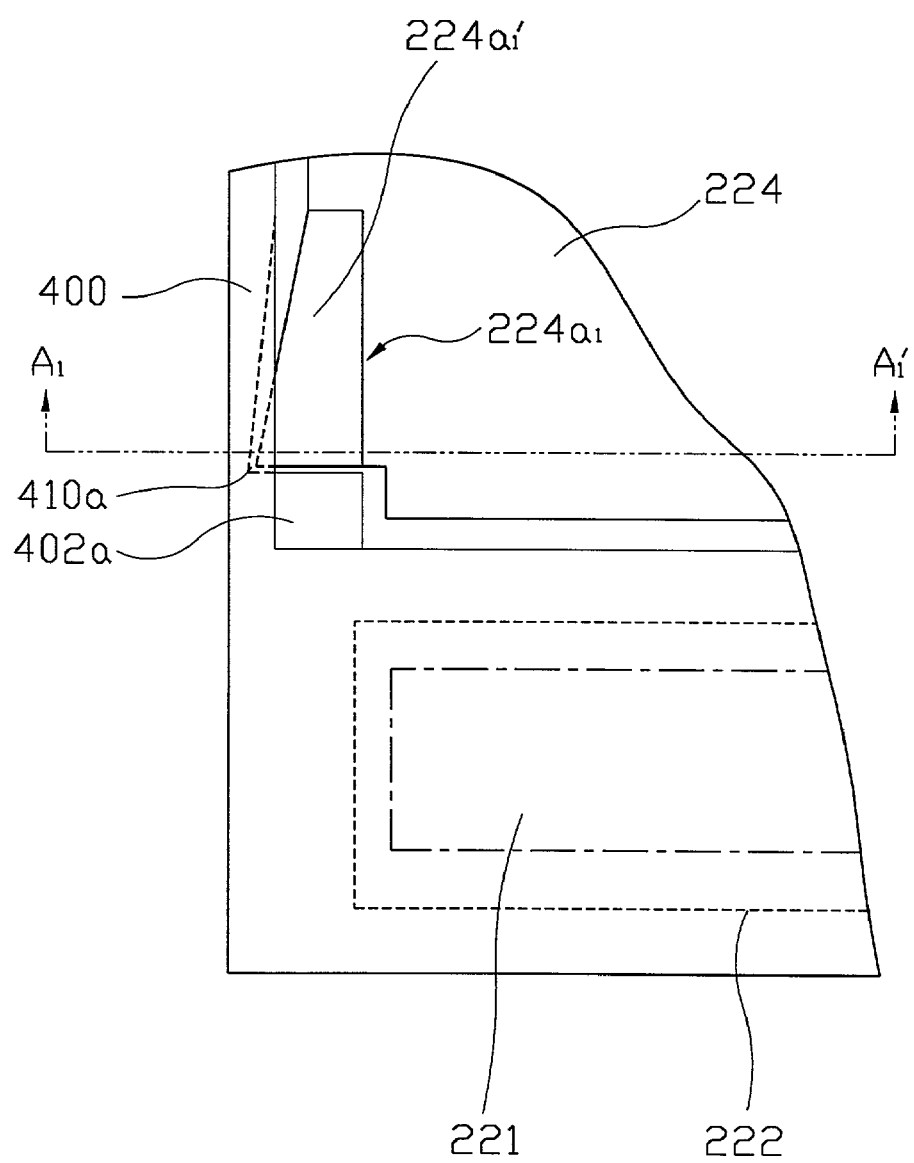
FIGS. 15 and 16 are views for showing the other state in which a catching body of the light guide plate is combined within a recess of the mold frame shown in FIG. 11.
Figure 16:
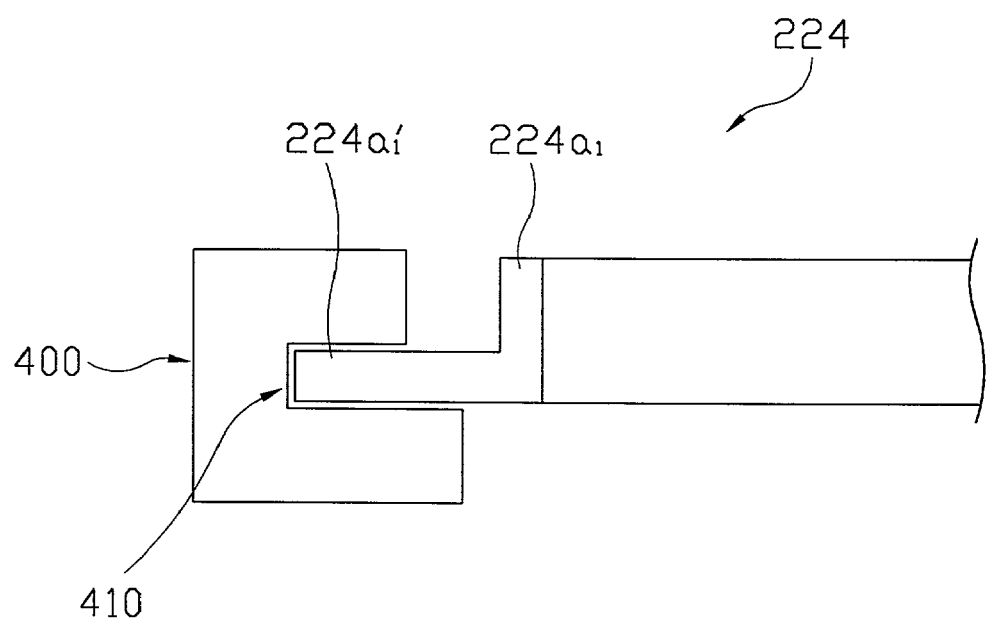

Referring to FIGS. 15 and 16, the light guide plate 224 may be combined to the mold frame 400 so that the first and second projections $224a_1'$ and $224b_1'$ are respectively received at a desired depth in the first and second recesses 410a and 412a.

On the other hand, when the first and second catching projections $224a_1'$ and $224b_1'$ are inserted into the first and second recesses 410a and 412a, respectively, it is possible to prevent the light guide plate 224 from moving away from the mold frame 400 toward the optical sheet 226 similarly to prevent the horizontal movement of the light guide plate 224. Preventing the light guide plate 224 from moving away from the mold frame 400 toward the optical sheet 226 is carried out by means of the third and fourth catching covers 406a and 408a.

As shown in FIG. 16, the thickness of an area in which the first catching jaw 224a is overlapped with the third catching boss 402a, when viewing from the lamp 221, is smaller than the thickness of the light guide plate 224. Preferably, the thickness of the area in which the first catching jaw is overlapped with the third catching boss 402 is the same as the thickness of the first projection $224a_1'$.

Embodiment 2

Hereinafter, a LCD device according to the second embodiment of the present invention will be explained with reference to FIGS. 17 to 21.

Figure 17:
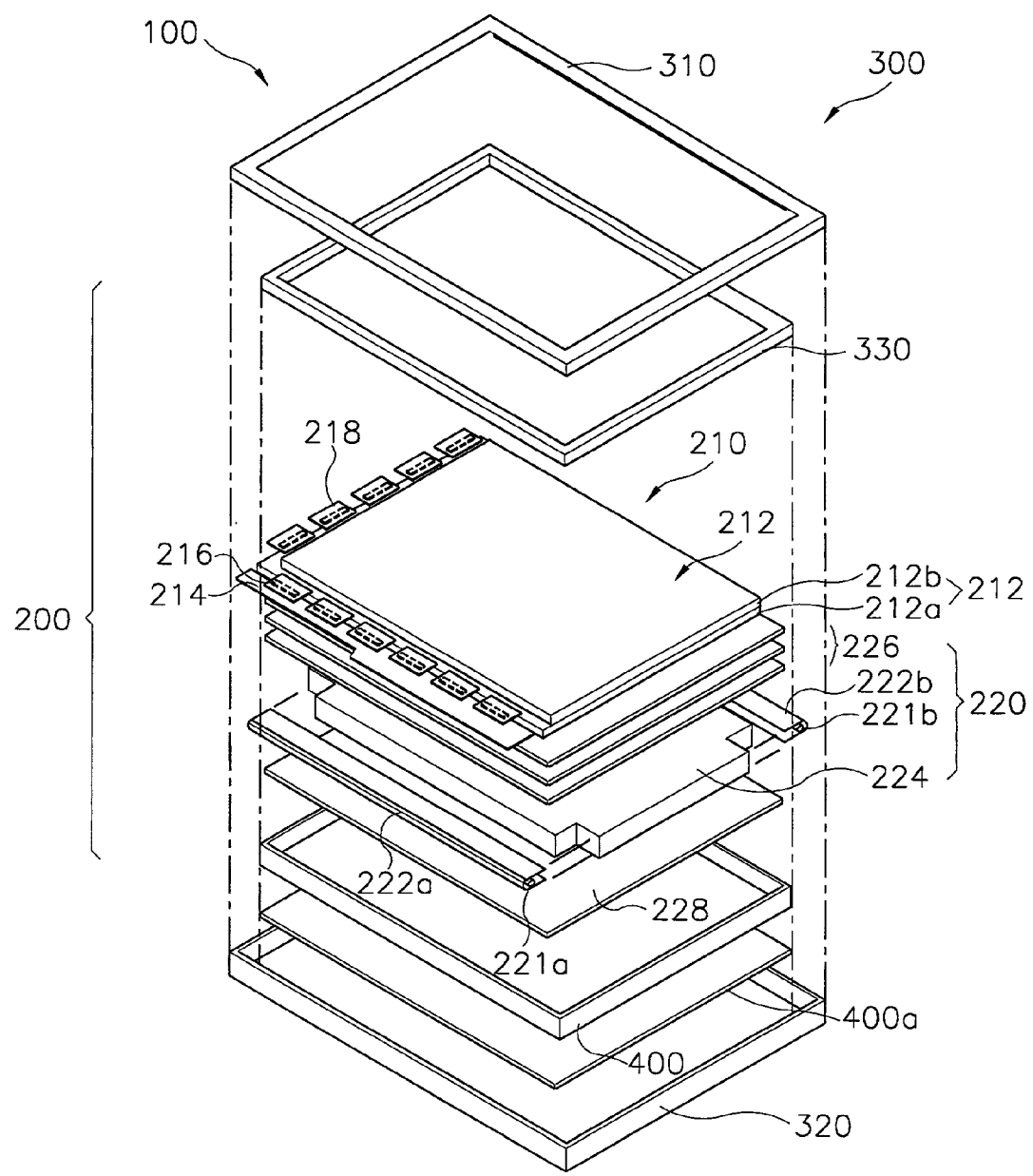
FIG. 17 is an exploded perspective view for showing a LCD device according to the second preferred embodiment of the present invention.

FIG. 17 is an exploded perspective view for showing the LCD device according to the second embodiment of the present invention.

Referring to FIG. 17, the LCD device according to the second embodiment of the present invention has the same structure as the LCD device according to the first embodiment of the present invention shown in FIG. 6, except for a back light assembly 220 and a back cover 400a. Namely, the LCD device according to the second embodiment of the present invention shown in FIG. 17 is a monitor device that employs two lamps. In the second embodiment of the present invention, the same elements having the same function as those of the LCD device shown in FIG. 6 are denoted by the same reference numerals.

As shown in FIG. 17, the backlight assembly 220 for providing the uniform light to the display unit 210 is provided under the display unit 210. The backlight assembly 220 has first and second lamps 221a and 221b, which are provided on both sides of the LCD module 220 to generate the light, and the first and second lamps 221a and 221b are protected by the first and second lamp covers 222a and 222b. The light guide plate 224 has a size corresponding to the LCD panel 212 of the display unit 210 and guides the light generated from the first and second lamps 221a and 221b towards the display unit 210 while changing the path of the light. The light guide plate 224 may be a plurality of light guide plates, or a single light guide plate.

The display unit 210 and the backlight assembly 220 are supported by means of the mold frame 400 as a receptacle assembly. A back cover 400a made of a metal for isolating and reducing EMI generated from the monitor device is combined with the rear surface of the mold frame 400.

Figure 18:
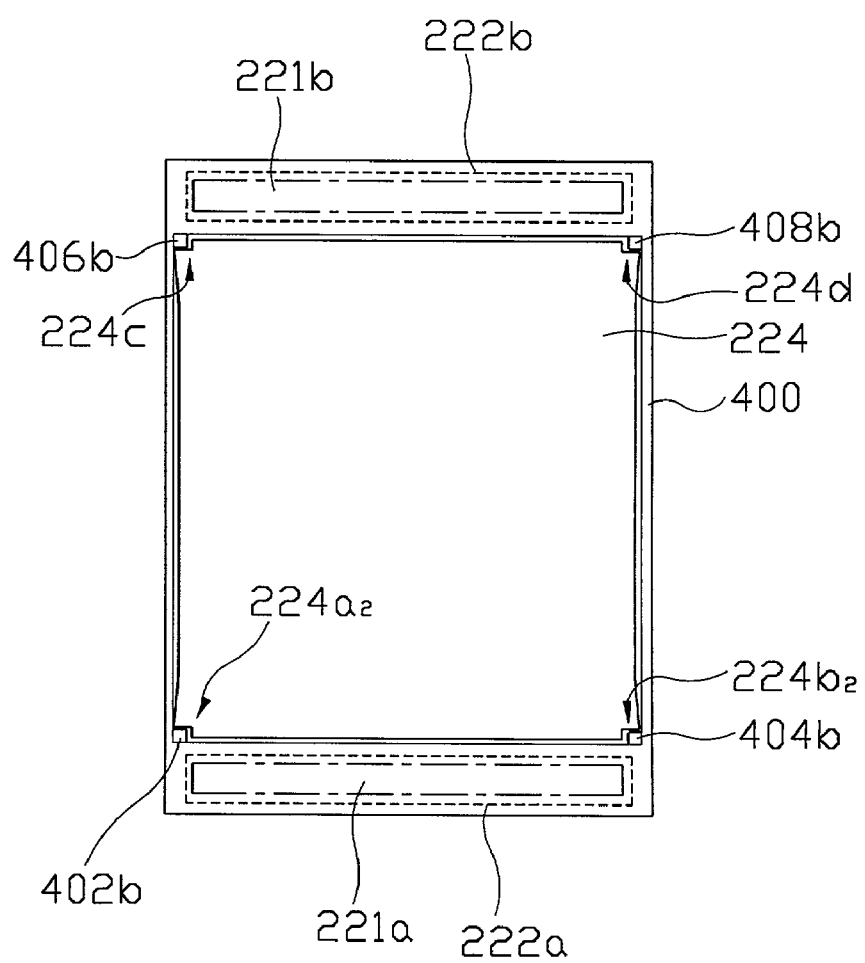
FIG. 18 is a view for showing the state in which a light guide plate shown in FIG. 17 is received in a mold frame.
Figure 19:
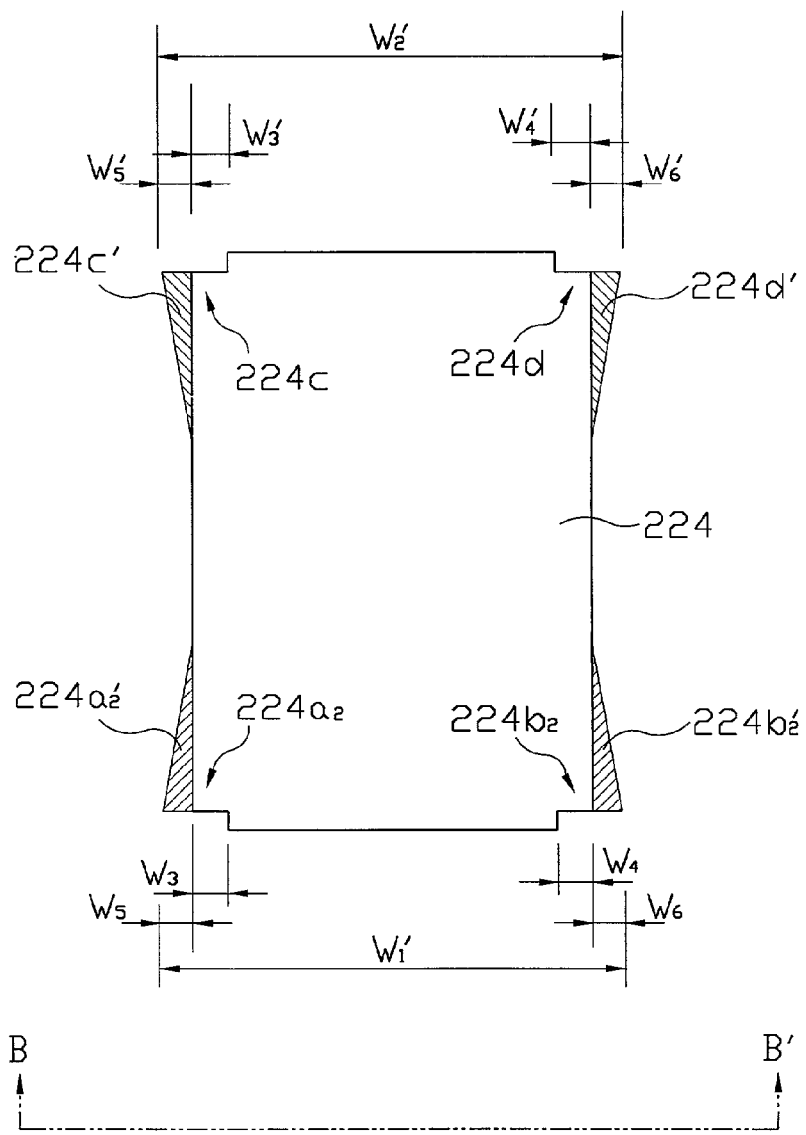
FIG. 19 is a top view for particularly showing the structure of the light guide plate shown in FIG. 11.

FIG. 18 shows the state in which the light guide plate according to the second embodiment of the present invention shown in FIG. 17 is received in the mold frame. FIG. 19 is a plan view for showing the structure of the light guide plate according to the second embodiment of the present invention shown in FIG. 10.

Referring first to FIG. 18, the first end portion of the light guide plate 224, i.e., both corner portions of the first end portion, which is faced to the sidewall at which the first lamp 221a is installed in the receiving space of the mold frame, is cut off to form a fifth catching jaw $224a_2$ and a sixth catching jaw $224b_2$. Further, the second end opposite to the first end portion of the light guide plate 224, i.e., both corner portions of the second end portion, which is faced to the sidewall at which the second lamp 221b is installed in the receiving space of the mold frame 400, is cut off to form a seventh catching jaw 224c and an eighth catching jaw 224d.

As shown in FIG. 19, the total width $W_1$' of the first end portion, at which the fifth and sixth catching jaws $224a_2$ and $224b_2$ are formed, is identical with the width $W_2$' of the second end portion at which the seventh and eighth catching jaws 224c and 224d are formed. Third, fourth, fifth and sixth projections $224a_2$', $224b_2$', 224c' and 224d' are respectively formed on the side surfaces of the fifth, sixth, seventh and eighth catching jaws $224a_2$, $224b_2$, 224c and 224d. The overall widths of the first and second end portions are wider than the width $W_7$ of the center portion of the light guide plate 224. The third, fourth, fifth and sixth projections $224a_2$', $224b_2$', 224c' and 224d' respectively have a thickness smaller than that of the fifth, sixth, seventh and eighth catching jaws $224a_2$, $224b_2$, 224c and 224d. This will be explained in detail with reference to FIGS. 19 and 20.

On the other hand, in the receiving space of the mold frame 400, which receives the light guide plate 224, the first lamp 221a and the first lamp cover 222a are received at the side that faces the first end portion of the light guide plate 224, and the second lamp 221b and the second lamp cover 222b are received at the side that faces the second end portion. Fifth and sixth catching bosses 402b and 404b, which are engaged with the fifth and six catching jaws $224a_2$ and $224b_2$ to prevent the movement of the light guide plate 224 toward the first lamp 221a, are integrally formed in the mold frame 400 at both corner portions of the sidewall at which the first lamp 221a is positioned. Seventh and eighth catching bosses 406b and 408b, which are engaged with the seventh and eighth catching jaws 224c and 224d to prevent the movement of the light guide plate 224 toward the second lamp 221b, are integrally formed in the mold frame 400 at both corner portions of the sidewall at which the second lamp 221b is positioned.

Figure 20:
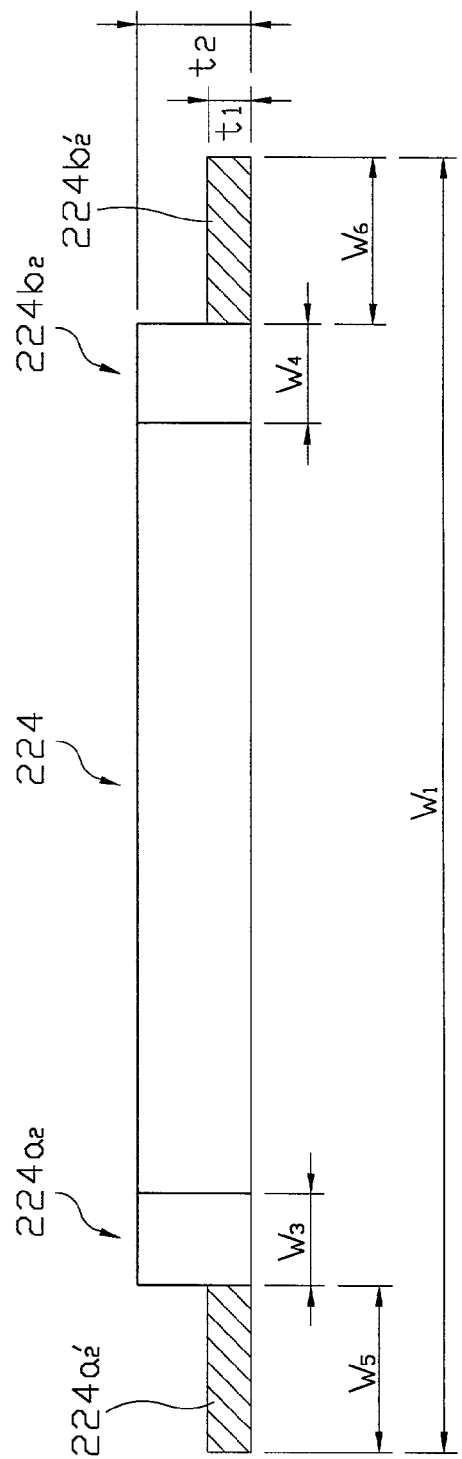
FIG. 20 is a sectional view for showing the sectional structure of the light guide plate shown in FIG. 19.

As shown in FIG. 20, when the light guide plate 224 is received in the receiving space of the mold frame 400, the fifth catching jaw $224a_2$ and the fifth catching boss 402b, the sixth catching jaw $224b_2$ and the sixth catching boss 404b, the seventh catching jaw 224c and the seventh catching boss 406b, and the eighth catching jaw 224d and the eighth catching boss 408b are respectively engaged with each other to prevent the movement of the horizontal direction of the light guide plate 224.

Referring to FIG. 20, the gap between the fifth catching jaw $224a_2$ and the mold frame 400 is narrower than the gap between the center portion of the light guide plate 224 and the mold frame 400. This is because the third projection $224a_2$' is integrally attached to the sidewall of the fifth catching jaw $224a_2$. The third projection $224a_2$' has a sloped shape in which the width $W_5$ thereof is narrower as it proceeds towards the center portion of the light guide plate 224. The projections, having the same shape as the third projection $224a_2$', are respectively formed on respective sidewalls the sixth, seventh and eighth catching jaws $224b_2$, 224c and 224d on the light guide plate 224. The catching force between the fifth, sixth, seventh and eighth catching jaws $224a_2$, $224b_2$, 224c and 224d and the fifth, sixth, seventh and eighth catching bosses 402b, 404b, 406b and 408b respectively increase to the extent of the widths $W_5$, $W_6$, $W_5$' and $W_6$' of the third, fourth, fifth and sixth projections $224a_2$', $224b_2$', 224c' and 224d'.

As shown in FIG. 19, the widths $W_3$, $W_4$, $W_3$' and $W_4$' of the fifth, sixth, seventh and eighth catching jaws $224a_2$, $224b_2$, 224c and 224d are the same before the third, fourth, fifth and sixth projections $224a_2$', $224b_2$', 224c' and 224d' are attached to the fifth, sixth, seventh and eights catching jaws $224a_2$, $224b_2$, 224c and 224d. However, if the third, fourth, fifth and sixth projections $224a_2$', $224b_2$', 224c' and 224d' are respectively attached to the respective sidewalls of the fifth, sixth, seventh and eighth catching jaws $224a_2$, $224b_2$, 224c and 224d, the width $W_1$' of the first end portion and the width $W_2$' of the second end portion of the light guide plate 224 are wider than the width $W_7$ of the center portion of the light guide plate 224 by the widths $W_5$ and $W_6$ of the third and fourth projections $224a_2$' and $224b_2$'. Therefore, as shown in FIG. 19, the catching forces between the fifth, sixth, seventh and eighth catching jaws $224a_2$, $224b_2$, 224c and 224d and the fifth, sixth, seventh and eighth catching bosses 402b, 404b, 406b and 408b are sufficiently obtained. Thus, the light guide plate 224 is prevented from moving toward the first lamp 221a or the second lamp 221b due to the exterior impact. Further, since the third, fourth, fifth and sixth projections $224a_2$', $224b_2$', 224c' and 224d' respectively have a sloped shape in which the widths $W_5$, $W_6$, $W_5$' and $W_6$' thereof are narrower as it proceeds towards the center portion of the light guide plate 224, the concentration of the light irradiated from the first and second lamps 221a and 221b is prevented.

FIG. 20 is a sectional view for the first end portion of the light guide plate 224 shown in FIG. 19.

As shown in FIG. 20, the thickness $t_1$ of the third and fourth projections $224a_2$' and $224b_2$' is thinner than the thickness $t_2$ of the fifth and sixth catching jaws $224a_2$ and $224b_2$. Furthermore, the fifth and sixth projections 224c' and 224d' respectively have a thinner thickness than that of the seventh and eighth catching jaws 224c and 224d. The third, fourth, fifth and sixth projections $224a_2$', $224b_2$', 224c' and 224d' have the same width $t_1$.

Figure 21:
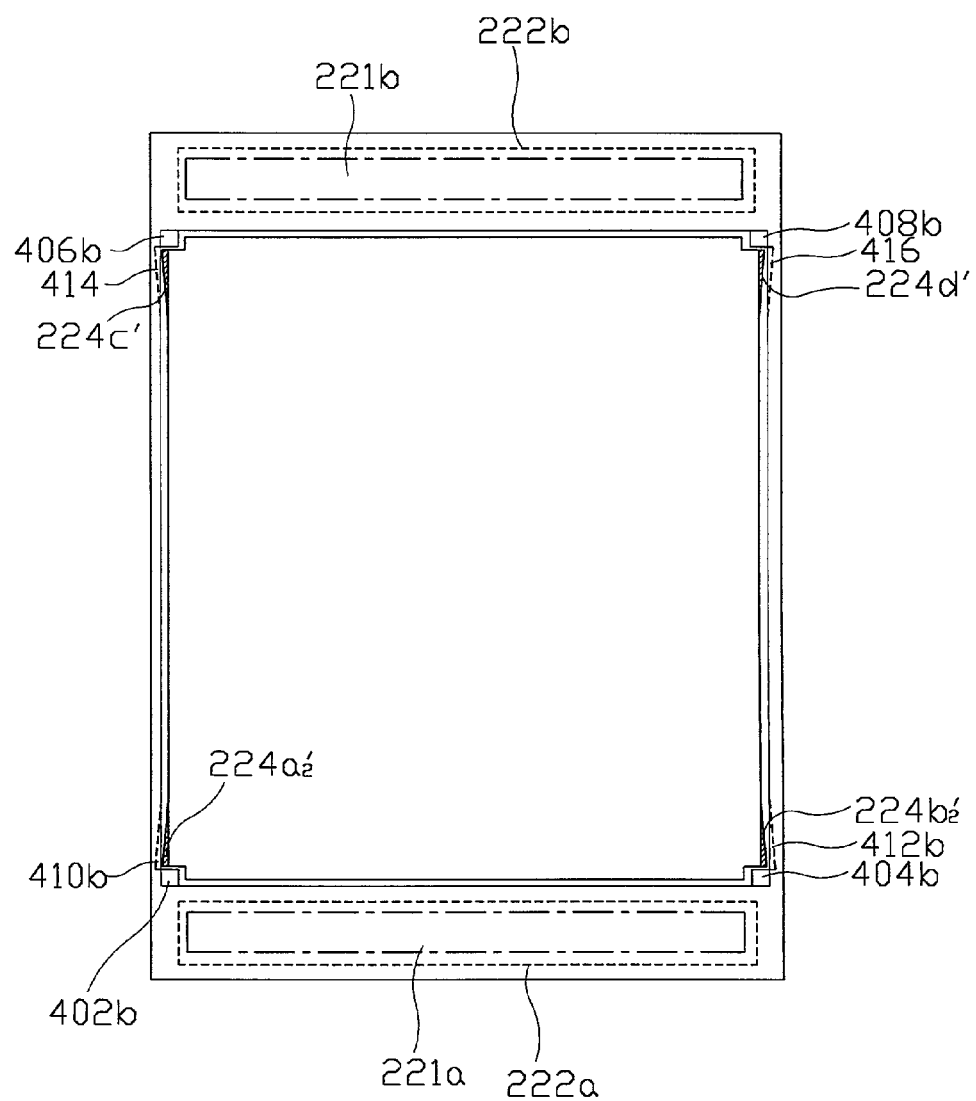
FIG. 21 is a top view for more particularly showing the combination of the light guide plate and the mold frame shown in FIG. 18.

FIG. 21 is a view for showing the structure of the mold frame shown in FIG. 18.

Referring to FIG. 21, the third, fourth, fifth and sixth recesses 410b and 412b, 414 and 416 are respectively formed on both sidewalls of the mold frame 400, i.e., the sidewalls corresponding to the third, fourth, fifth and sixth projections $224a_2$', $224b_2$', 224c' and 224d', to receive the third, fourth, fifth and sixth projections $224a_2$', $224b_2$', 224c' and 224d'.

In the same manner as in the first embodiment of the present invention, the height of the openings of the third, fourth, fifth and sixth recesses 410b, 412b, 414 and 416 are larger than the thickness $t_1$ of third, fourth, fifth and sixth projections $224a_2$', $224b_2$', 224c' and 224d' but smaller than the thickness $t_2$ of the fifth, sixth, seventh and eighth catching jaw $224a_2$, $224b_2$, $224c$ and $224d$.

Namely, the third, fourth, fifth and sixth recesses 410b, 412b, 414 and 416 respectively have a depth enough to receive the third, fourth, fifth and sixth projections $224a_2'$, $224b_2'$, $224c'$ and $224d'$. The depth at which the third, fourth, fifth and sixth projections $224a_2'$, $224b_2'$, $224c'$ and $224d'$ are respectively received in the fifth, sixth, seventh and eighth recesses 410b, 412b, 414 and 416 is adjusted by the fifth, sixth, seventh and eighth catching jaw $224a_2$, $224b_2$, $224c$ and $224d$.

As shown in FIG. 21, since the catching amount between the fifth, sixth, seventh and eighth catching jaws $224a_2$, $224b_2$, $224c$ and $224d$ and the fifth, sixth, seventh and eighth catching bosses 402b, 404b, 406b and 408b are sufficiently obtained, it is possible to prevent the light guide plate 224 from moving toward the lamp 221 in the mold frame 400 due to the exterior impact.

If the exterior impact is forced to both sidewalls of the mold frame 400, i.e., the third, fourth, fifth and sixth projections $224a_2'$, $224b_2'$, $224c'$ and $224d'$ in the state that the light guide plate 224 is received in the mold frame 400, the third, fourth, fifth and sixth projections $224a_2'$, $224b_2'$, $224c'$ and $224d'$ of the light guide plate 224 firstly make contact with the respective sidewall of the mold frame 400.

At that time, as the third, fourth, fifth and sixth recesses 410b, 412b, 414 and 416 receive the third, fourth, fifth and sixth projections $224a_2'$, $224b_2'$, $224c'$ and $224d'$ until making contact with the third, fourth, fifth and sixth catching jaws $224a_1$, $224b_1$, $224a_2$ and $224b_2$, the third, fourth, fifth and sixth projections $224a_2'$, $224b_2'$, $224c'$ and $224d'$ are prevented from colliding with the mold frame 400 to thereby prevent a damage.

Meanwhile, the light guide plate 224 may be combined to the mold frame 400 in order for the third, fourth, fifth and sixth projections $224a_2'$, $224b_2'$, $224c'$ and $224d'$ to be respectively received at a desired depth in the third, fourth, fifth and sixth recesses 410b, 412b, 414 and 416. Accordingly, the departure of the light guide plate 224 from the mold frame 400 toward the optical sheet 226 is prevented. Furthermore, when viewing from the first or second lamps 221a and 221b, respective areas of which the fifth, sixth, seventh and eighth catching jaws $224a_2$, $224b_2$, $224c$ and $224d$ are respectively overlapped with the fifth, sixth, seventh and eighth catching bosses 402b, 404b, 406b and 408b have a smaller thickness than the thickness of the light guide plate 224. Preferably, the thickness of each area in which the fifth, sixth, seventh and eighth catching jaws $224a_2$, $224b_2$, $224c$ and $224d$ are respectively overlapped with the third, fourth, fifth and sixth catching bosses 402b, 404b, 406b and 408b is the same as the thickness of the third, fourth, fifth and sixth projections $224a_2'$, $224b_2'$, $224c'$ and $224d'$.

According to the LCD module and the LCD device, the catching jaws are formed at both corners of the end portion of the light guide plate opposite to the lamp received in the mold frame and the projections which have the sloped shape extend outwardly from the respective sidewalls of the catching jaws. Furthermore, the recesses are respectively formed at the positions corresponding to the respective projections in the sidewalls of the mold frame to receive the projections, of which widths are respectively larger than the thickness of the projections but smaller than the thickness of the catching jaws.

Accordingly, since the catching force between the catching bosses of the mold frame and the catching jaws of the light guide plate increases greatly, the catching bosses of the mold frame are respectively and rigidly engaged with the catching jaws to prevent the light guide plate from moving toward the lamp even if an exterior impact is forced to the LCD device. In addition, even though the exterior impact is applied to sidewalls of the mold frame, the projections and the catching jaws can be prevented from being damaged because the projections are respectively received in the recesses of the mold frame. Further, since the projections are formed in a sloped shape, the concentration of the light inputted from the lamp is prevented.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A liquid crystal display (LCD) module, comprising:
   a light guide plate for guiding light emitted from a lamp unit to a display unit to display an image, the light guide plate having a catching jaw and projection formed by cutting at least one corner of a first end portion that receives the light from the lamp unit, and the projection that extends outwardly from a sidewall of the catching jaw and has a smaller thickness than the catching jaw; and
   a mold frame for receiving the light guide plate and the lamp unit, the mold frame having a catching boss and a recess, the catching boss being formed at a first position corresponding to the catching jaw on a bottom surface of the mold frame to engage with the catching jaw to fix the light guide plate in the mold frame, and the recess being formed at a second position corresponding to the projection in a sidewall of the mold frame to receive the projection.

2. The LCD module of claim 1, wherein the mold frame further has a catching cover being formed at a corner portion of the sidewall of the mold frame opposite to the catching boss so as to prevent the light guide plate from being deviated in a vertical direction from the mold frame.

3. The LCD module of claim 1, wherein the projection is formed in a sloped shape having a width that gradually decreases from the first end portion to a center portion of the light guide plate.

4. The LCD module of claim 1, wherein the light guide plate is a wedge type light guide plate having a thickness that gradually decreases from the first end portion to a second end portion opposite to the first end portion.

5. The LCD module of claim 1, wherein the recess formed at the sidewall of the mold frame has a width that is larger than the thickness of the projection but smaller than the thickness of the catching jaw.

6. The LCD module of claim 1, wherein the thickness of the catching jaw at an area where the catching jaw overlaps with the catching boss, when viewing from the lamp unit side, is substantially identical with the thickness of the projection.

7. A liquid crystal display (LCD) device, comprising:
   a backlight assembly including a light guide plate for guiding light emitted from a lamp unit to a display unit to display images, the light guide plate having a catching jaw and projection, the catching jaw being formed by cutting at least one corner of a first end portion that receives the light from the lamp unit, and the projection extends outwardly from a sidewall of the catching jaw and has a smaller thickness than the catching jaw;
   a mold frame for receiving the light guide plate and the lamp unit, the mold frame having a catching boss and a recess, the catching boss being formed at a first position corresponding to the catching jaw on a bottom surface of the mold frame to engage with the catching jaw to fix the light guide plate in the mold frame, and the recess being formed at a second position corresponding to the projection in a sidewall of the mold frame to receive the projection; and a chassis arranged on the mold frame to guide the display unit while fixing the display unit and the backlight assembly to the mold frame.

8. The LCD device of claim 7, wherein the projection is formed in a sloped shape having a width that gradually decreases from the first end portion to a center portion of the light guide plate.

9. The LCD device of claim 7, wherein the light guide plate is a wedge the light guide plate having a thickness that gradually decreases in thickness from the first end portion to a second end portion opposite to the first end portion.

10. The LCD device of claim 7, wherein the recess formed in the sidewall of the mold frame has a width that is larger than the thickness of the projection but smaller than the thickness of the catching jaw.

11. The LCD device of claim 7, wherein the thickness of the catching jaw at an area where the catching jaw overlaps with the catching boss, when viewing from the lamp unit side, is substantially identical with the thickness of the projection.

12. The LCD module of claim 7, wherein the mold frame further has a catching cover formed at a corner portion of the sidewall of the mold frame opposite to the catching boss to prevent the light guide plate from being deviated in a vertical direction from the mold frame.

* * * * *